United States Patent
Sadovsky et al.

(10) Patent No.: US 9,436,553 B2
(45) Date of Patent: Sep. 6, 2016

(54) RECOVERING USABILITY OF CLOUD BASED SERVICE FROM SYSTEM FAILURE

(71) Applicant: Microsoft Corporation, Redmond, WA (US)

(72) Inventors: Art Sadovsky, Bellevue, WA (US); Timur Sadykov, Redmond, WA (US); Ashish Premaraj, Seattle, WA (US); Venkat Narayanan, Redmond, WA (US); Smita Ojha, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 192 days.

(21) Appl. No.: 14/451,369

(22) Filed: Aug. 4, 2014

(65) Prior Publication Data

US 2016/0034355 A1 Feb. 4, 2016

(51) Int. Cl.
| | |
|---|---|
| *G06F 11/00* | (2006.01) |
| *G06F 11/14* | (2006.01) |
| *H04L 29/08* | (2006.01) |
| *G06F 11/34* | (2006.01) |

(52) U.S. Cl.
CPC ......... *G06F 11/142* (2013.01); *G06F 11/3414* (2013.01); *G06F 11/3438* (2013.01); *H04L 67/10* (2013.01); *G06F 2201/805* (2013.01); *G06F 2201/86* (2013.01)

(58) Field of Classification Search
CPC ............. G06F 11/3414; G06F 11/142; G06F 11/3438; G06F 11/3457; H04L 67/10
See application file for complete search history.

(56) References Cited

U.S. PATENT DOCUMENTS

| | | | |
|---|---|---|---|
| 6,487,677 B1* | 11/2002 | Jantz ................... | G06F 11/0748 714/2 |
| 8,418,000 B1 | 4/2013 | Salame | |
| 8,661,125 B2 | 2/2014 | Avner et al. | |
| 8,910,294 B1* | 12/2014 | Sennett ............... | H04L 63/1433 726/25 |
| 2002/0138226 A1* | 9/2002 | Doane ................. | G06F 11/2294 702/119 |
| 2011/0154109 A1* | 6/2011 | Levine ...................... | G06F 8/70 714/26 |
| 2012/0124193 A1* | 5/2012 | Ebrahim ............. | H04L 41/0663 709/224 |
| 2012/0297238 A1 | 11/2012 | Watson et al. | |
| 2013/0086203 A1* | 4/2013 | Avner .................. | G06F 11/3495 709/217 |
| 2013/0275518 A1* | 10/2013 | Tseitlin ................... | G06F 11/36 709/206 |
| 2014/0068335 A1* | 3/2014 | Bromley ................. | H04L 43/50 714/32 |
| 2016/0085664 A1* | 3/2016 | Horovitz ............... | G06F 11/261 714/38.1 |

OTHER PUBLICATIONS

"International Search Report and Written Opinion Issued in PCT Application No. PCT/US2015/043514", Mailed Date: Jan. 22, 2016, 23 Pages.
"Webwalk", Published on Sep. 3, 2011. Available at: http://absoluteperformance.com/products/webwalk.
(Continued)

*Primary Examiner* — Philip Guyton
(74) *Attorney, Agent, or Firm* — Reith Damon; Jim Ross; Micky Minhas

(57) ABSTRACT

Usability of a cloud based service is recovered from a system failure. A customer transaction associated with the customer experience is executed to simulate the customer experience in the cloud based service. A failure associated with a subsystem the cloud based service is detected from an output of the customer transaction. A recovery action is determined to be associated with the failure. The recovery action is executed on the subsystem and monitored to determine a success status.

19 Claims, 7 Drawing Sheets

(56) References Cited

OTHER PUBLICATIONS

Brown, et al., "Experience with Evaluating Human-Assisted Recovery Process", In IEEE International Conference on Dependable Systems and Networks, Jun. 28, 2004, 6 pages.

"JumpCenter Overview", Published on Mar. 2, 2014. Available at http://www.jumpsoft.net/solutions/jumpcenter-features/.

Sarojadevi, H., "Performance Testing: Methodologies and Tools", In Journal of Information Engineering and Applications, vol. 2, No. 3, May 7, 2014, pp. 53-62.

"Testing for Peak Performance", In Whitepaper of Borland, Apr. 21, 2013, 7 pages.

"Load Impact—On Demand", published on May 19, 2011. Available at: http://www.getapp.com/load-impact-load-testing-tool-application.

"HMRC's IT Platform Enables Expansion of Online Services", Retrieved on: May 7, 2014 Available at: http://www.uk.capgemini.com/resource-file-access/resource/pdf/ss_HMRC_s_IT_Platform_Enables_Expansion_of_Online_Services.pdf.

Jules, et al., "Model-Driven Automated Error Recovery in Cloud Computing", Retrieved on: May 7, 2014, Available at: http://citeseerx.ist.psu.edu/viewdoc/download?doi=10.1.1.150.7243&rep=rep1&type=pdf.

Second Written Opinion Issued in PCT Application No. PCT/US2015/043514, Mailed Date: Jun. 20, 2016, 17 Pages.

\* cited by examiner

RECOVERING USABILITY OF CLOUD BASED SERVICE FROM SYSTEM FAILURE

BACKGROUND

Distributed computing technologies have enabled multiple computing resources to provide coordinated and distinct solutions. An example of distributed computing, cloud computing brings together multiple systems to provide solutions to user needs. Cloud computing can span a vast array of computing resources. The computing resources utilized in cloud computing applications and services are dispersed across networks and locations. Dispersed computing resources are remotely controlled and managed. Usually, manual solutions provide installation and configuration support to cloud computing assets. Manual installation solutions by human components of widely dispersed computing resources are not cost effective.

Conventional recovery solutions for cloud computing systems have limitations. Conventional recovery solutions typically address failures at individual components of a cloud computing system. The health of an individual component is monitored locally. Notifications on the health of the individual component is transmitted to a central controller. Conventional recovery solutions also monitor cluster of components. Recovery actions are transmitted and executed to a cluster to resolve failures associated with individuals in the cluster.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to recovering usability of a cloud based service from a system failure. In some example embodiments, a management application of the cloud based service may simulate a customer transaction associated with a customer experience. The customer experience may include one or more customer transactions that form a use scenario associated with the cloud based service. A failure associated with the cloud based service may be detected from an output of the customer transaction that was simulated. The failure may be analyzed to determine a recovery action by mapping the failure to the recovery action. The recovery action may be executed and monitored to determine a success status.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
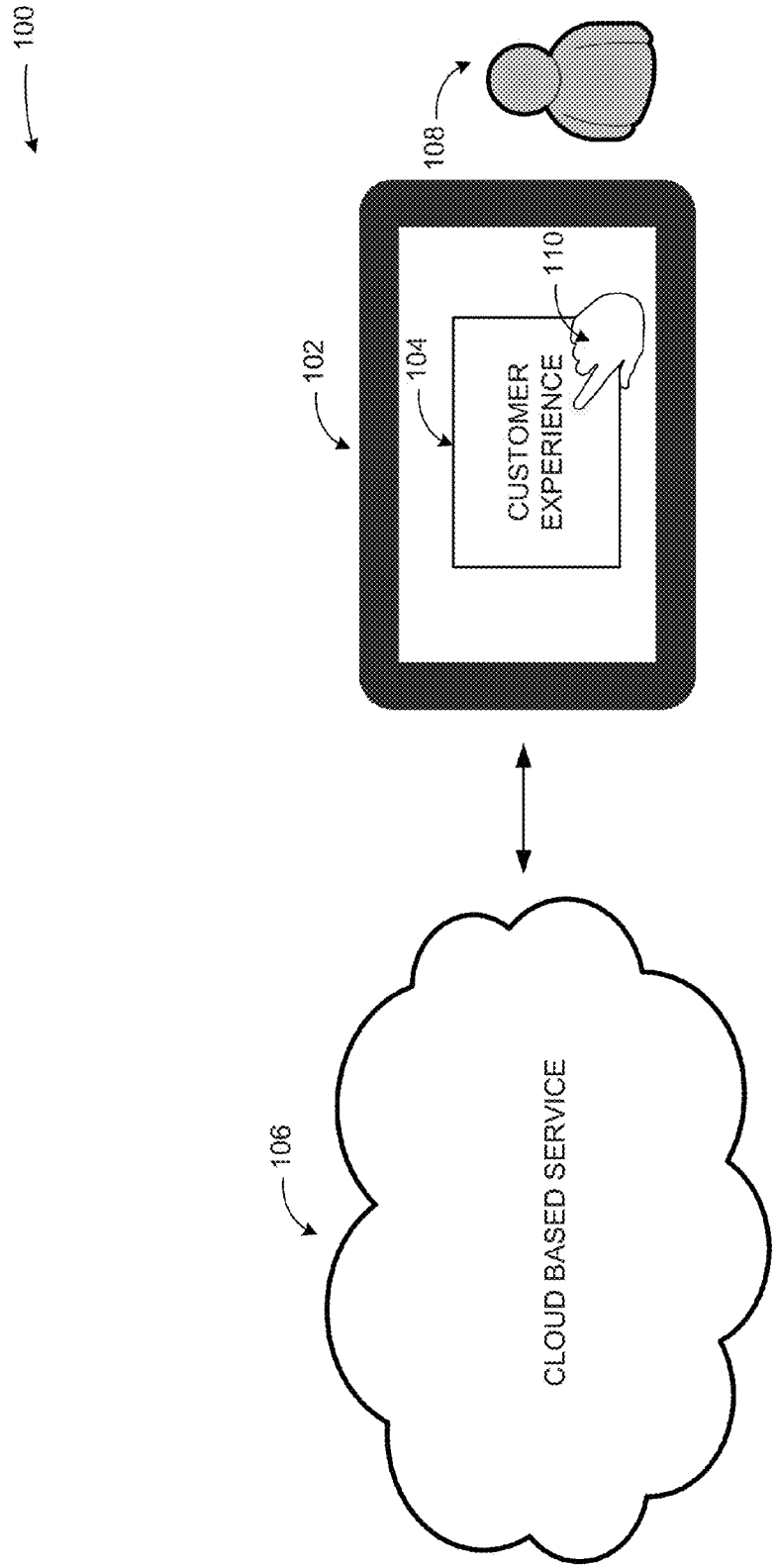
FIG. 1 is a conceptual diagram illustrating an example recovery of a cloud based service based on a customer experience, according to embodiments.

As briefly described above, usability of a cloud based service may be recovered from a system failure by a management application associated with a cloud based service. A customer transaction associated with the customer experience may be simulated to simulate the customer experience. A failure associated with the cloud based service may be detected from an output of the customer transaction. A recovery action may be determined to be associated with the failure. The recovery action may be executed and monitored to determine a success status.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to recover usability of a cloud based service from a system failure. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is a conceptual diagram illustrating an example recovery of a cloud based service based on a customer experience, according to embodiments.

In a diagram 100, a cloud based service 106 may provide services to a customer 108 through a client device 102. The cloud based service 106 may provide an expansive variety of services through a client interface at the client device 102. The services may include document sharing, e-mail services, storage services, among others. In addition, the customer 108 (who is authorized to interact with the client device 102) may be an entity that includes a person, multiple persons, a group of persons, an organization, among others.

The cloud based service 106 may be a distributed application that provides services through one or more computing devices that execute one or more components of the distributed application. The one or more computing devices may be connected through one or more networks that use wired or wireless infrastructure. An example of the cloud based service 106 may include an e-mail service. The e-mail service may be hosted in multiple computing devices. The e-mail service may be divided between the computing devices based on an available processing capacity of each computing device. In another example scenario, the cloud based service 106 may include a document sharing service. The document sharing service may distribute stored documents across multiple computing devices based on available storage capacity of each computing device. The examples of the cloud based service 106 as an e-mail service and a document sharing service were not provided in a limiting sense. The cloud based service 106 may include any distributed computation solution that provides a service to one or more customers such as the customer 108.

The customer 108 may be enabled to interact with the cloud based service 106 through the client device 102. The client device 102 may include a number of computing devices such as a desktop computer, a smart phone, a notebook computer, a tablet computer, among others. The customer 108 may interact with the cloud based service 106 through a client interface of the cloud based service 106 that is provided by the client device 102. Alternatively, the cloud based service 106 may provide the client interface and the client device 102 may render the client interface within a client application. The customer 108 may interact with the client interface through a number of input modalities that may include a touch based action 110, a keyboard based input, a mouse based input, among others. The touch based action 110 may include a number gestures such as touch action, a swipe action, among others.

One or more interactions of the customer 108 with the client interface of the cloud based service 106 may be encompassed within a customer experience 104. The customer experience 104 may be a container for one or more customer tasks. An example of the customer experience 104 may include the customer 108 initiating the client interface of an e-mail service and reading one or more e-mails associated with a user account of the customer 108. Another example of the customer experience 104 may include the customer 108 initiating an editing client interface of a document sharing service to edit the document. The customer experience 104 may also include the customer 108 editing the document and saving the document.

While the example system in FIG. 1 has been described with specific components including the cloud based service 106 and the customer experience 104, embodiments are not limited to these components or system configurations and can be implemented with other system configuration employing fewer or additional components.

Figure 2:
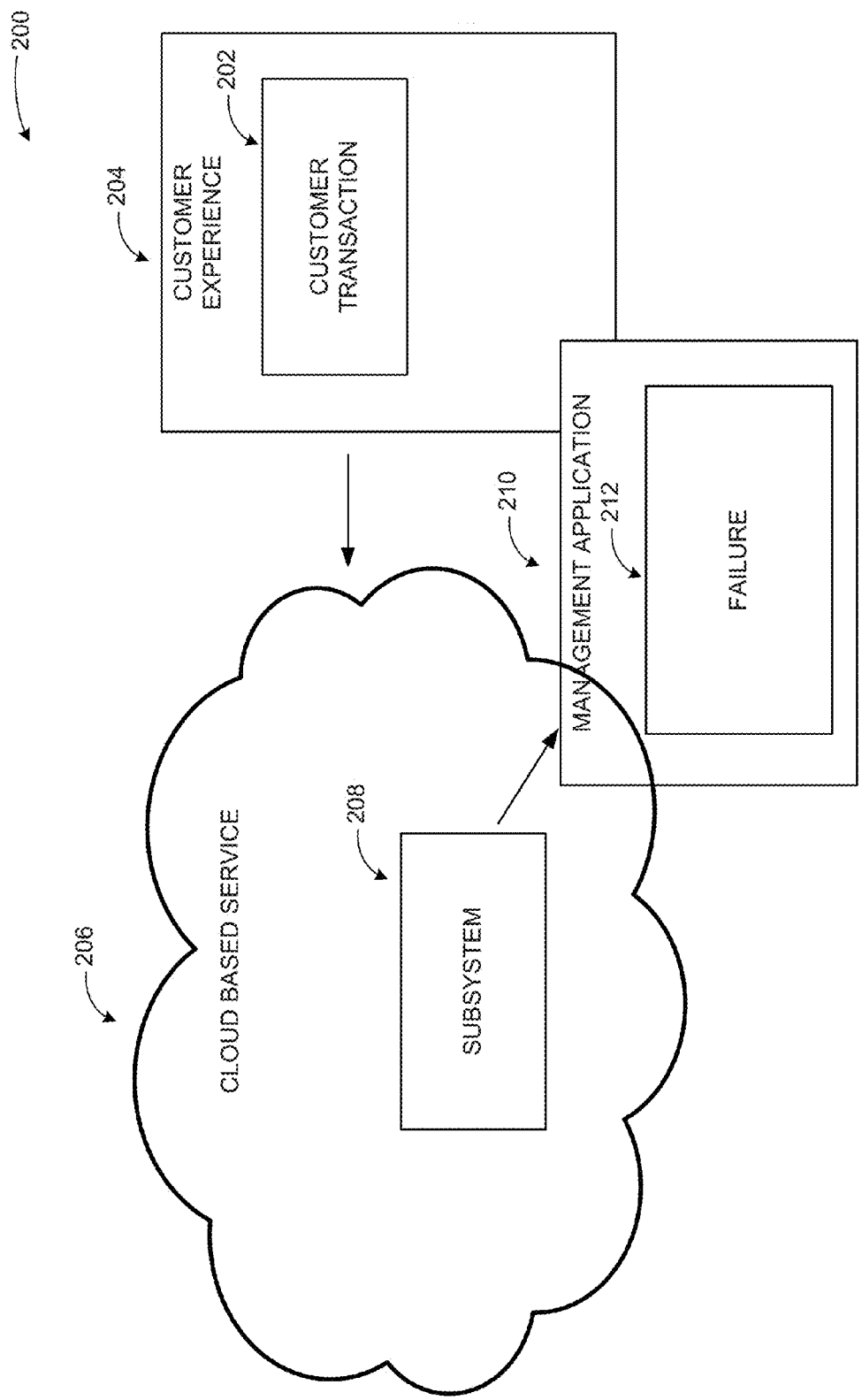
FIG. 2 illustrates components of a scheme to recover a cloud based service based on a customer experience, according to embodiments.

FIG. 2 illustrates components of a scheme to recover a cloud based service based on a customer experience, according to embodiments.

In a diagram 200, a scheme to recover a cloud based service 206 based on a customer experience 204 may be described. A management application 210 may simulate a customer transaction 202 to determine a failure 212 associated with a subsystem 208 of the cloud based service 206.

The management application 210 may include an application that monitors and manages the cloud based service 206. The management application 210 may be a component of the cloud based service 206. Alternatively, the management application 210 may be a standalone application that may be authorized to interact with the cloud based service 206.

The management application 210 may select the customer experience from a set of customer experiences associated with a health monitoring of the cloud based service 206. The health monitoring of the cloud based service 206 may include processes (such as monitoring and resolution of disrupted functionality) for continued operations provided by the cloud based service 206. In addition, the customer experience 204 may be selected based on a criteria that includes a frequency of use, a historical use distribution, and a recentness of use of the customer experience 204. In an example scenario, the management application 210 may select the customer experience 204 that is most frequently used from a set of customer experiences that are sorted based on a frequency of use. In another example scenario, the management application 210 may select the customer experience 204 that is at a top of a historical use distribution of the set of customer experiences. In yet another example scenario, the management application 210 may select the customer experience 204 that is most recently used from the set of customer experiences that are sorted based on a recentness of use.

Alternatively, the management application 210 may receive a selection of the customer experience 204 from a set of customer experiences associated with a health monitoring of the cloud based service 206. The selection may be made by a stakeholder including a customer associated with the customer experience 204 or an administrator of the cloud based service 206.

Furthermore, the customer experience 204 may store the customer transaction 202. The customer transaction 202 may include one or more commands that may be executed by the cloud based service 206 through the subsystem 208. The subsystem 208 may generate an output during a simulation of the customer transaction 202. The output may be used to determine a failure associated with the customer transaction 202.

The management application 210 may also determine that the customer experience 204 may store one or more other customer transactions along with the customer transaction 202. The one or more other customer transactions may also be simulated to detect the failure 212 or one or more other failures associated with the cloud based service 206. An example may include simulation of the customer experience 204 in an e-mail service as an example of the cloud based service 206. The customer transaction 202 may include an e-mail interface initiation action. The one or more other customer transactions may include retrieval of e-mails and rendering of the e-mails associated with the customer experience 204.

The subsystem 208 of the cloud based service 206 may simulate the customer transaction 202. The failure 212 may be detected during the simulation of the customer transaction 202. The subsystem 208 may report the failure 212 through an output of the customer transaction 202.

Alternatively, the failure 212 may also be extrapolated from usage data. Usage data may also be referred to as passive data. The usage data may include measurements of one or more customer transactions of a use scenario of the cloud based service 206. The measurements may capture errors associated with the use scenario of the cloud based service 206. A client device associated with the cloud based service 206 may capture the usage data and transmit the usage data to an analysis application such as the management application 210. The management application 210 may process the usage data to detect the failure 212 based on a number of errors reported by the usage data that exceed a threshold. The threshold may be configured by a stakeholder of the cloud based service 206. Private data may also be removed from the usage data to anonymize the usage data. An example of private data may include a location of a customer, among others. The usage data may also be aggregated based on common criteria such as identification information of one or more subsystems associated with the cloud based service 206 that are failing, among others.

The usage data may be captured in log files by the client device and transmitted to the management application 210. The management application 210 may parse the log files to extract information associated with the failure 212. The management application 210 may also retrieve the usage data from other sources such as devices of the cloud based service 206. The cloud based service 206 may allocate resources to capture measurements of use scenarios associated with customers. The measurements may be stored as the usage data and made available to analysis applications such as the management application 210 for monitoring and analysis of the failure 212.

Figure 3:
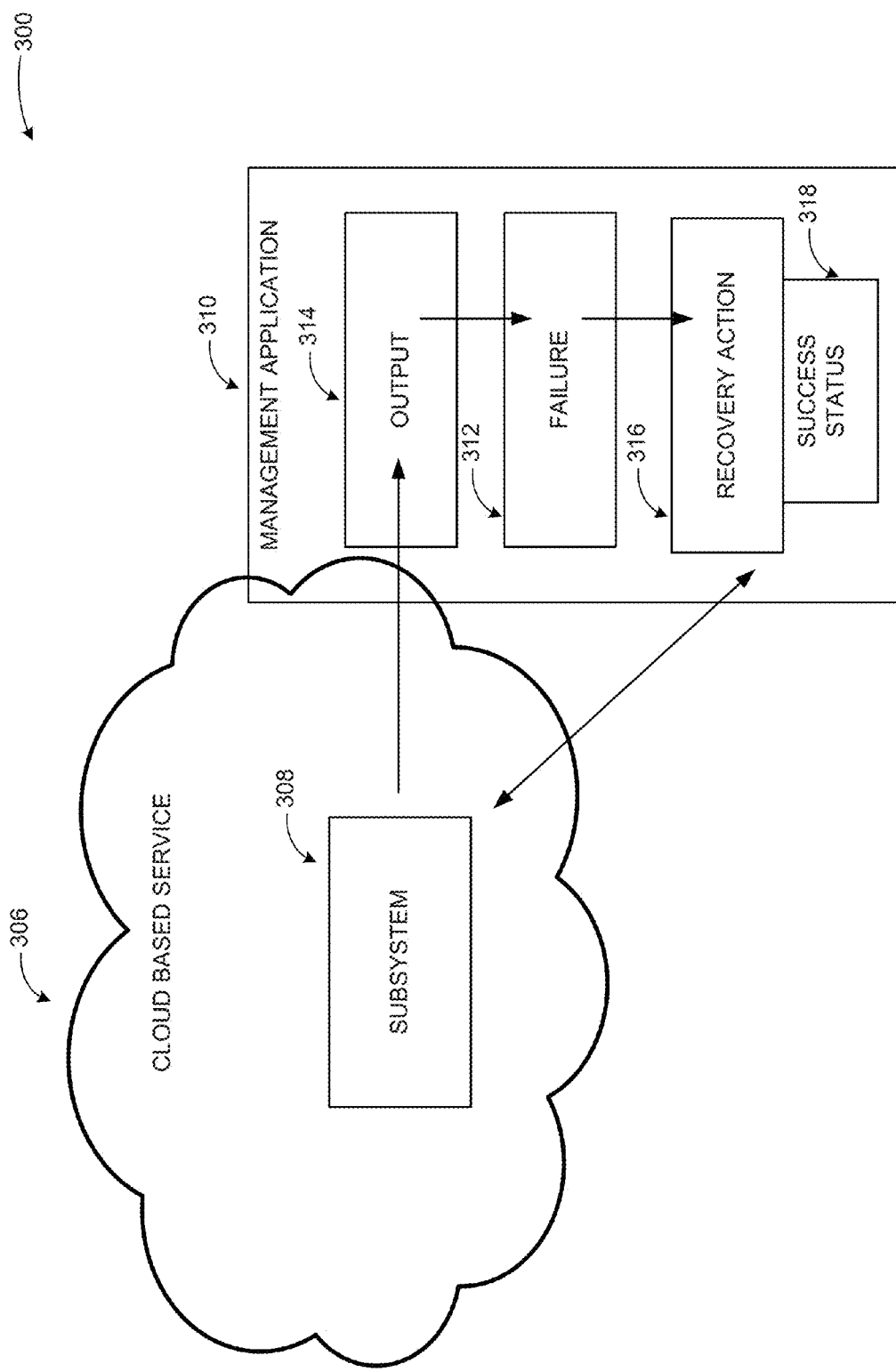
FIG. 3 illustrates additional components of a scheme to recover a cloud based service based on a customer experience, according to embodiments.

FIG. 3 illustrates additional components of a scheme to recover a cloud based service based on a customer experience, according to embodiments.

In a diagram 300, a management application 310 may determine a failure 312 from an output 314 of a customer transaction simulated on a cloud based service 306. The output 314 may also be aggregated based on common criteria such as identification information of one or more subsystems associated with the cloud based service 306 that are failing, among others. The failure 312 may be mapped to a recovery action 316 which may be executed on a subsystem 308 associated with the failure 312. The recovery action 316 may be monitored to determine a success status 318 of the recovery action 316.

The management application 310 may execute the recovery action 316 on the subsystem 308 to restore the subsystem 308 to a healthy status. Alternatively, the recovery action 316 may be executed to reroute one or more processes associated with the subsystem 308 (the failed subsystem) to a healthy subsystem that provides a failover functionality.

According to some examples, one or more metrics associated with the customer experience may be tracked while monitoring the recovery action 316. The one or more metrics may include measurements associated with one or more customer transactions simulated on one or more subsystems of the cloud based service 306. The metrics may be monitored during the recovery action 316 to determine that the one or more metrics are above one or more thresholds associated with the success status 318.

An availability number may be generated from the metrics associated with the subsystem 308 that may be simulating the customer experience. The metrics may be determined from the output 314. The failure 312 may be determined in response to another determination that the availability number is less than a threshold. The threshold may be configurable by an administrator of the cloud based service 306.

The management application 310 may also determine another recovery action that is associated with the failure 312 in response to a determination that the success status 318 is negative. When the recovery action 316 fails to restore the subsystem 308 to a healthy status then the management application 310 may retrieve the other recovery action from a list of recovery actions that match the failure 312 and execute the other recovery action. The other recovery action may also be monitored to determine the success status 318 to restore the subsystem 308 to a healthy status. The recovery action 316 may be a first recovery action. The other recovery action may be a second recovery action.

According to other examples, the management application 310 may analyze the output 314 to determine one or more criteria. The criteria may include identification information of one or more subsystems associated with the cloud based service 306 that are failing, a number of the one or more subsystems that are failing, a pattern associated with the one or more subsystems that are failing, among others. The criteria may be included in the failure 312. The failure 312 may be mapped to the recovery action 316 based on the criteria.

Figure 4:
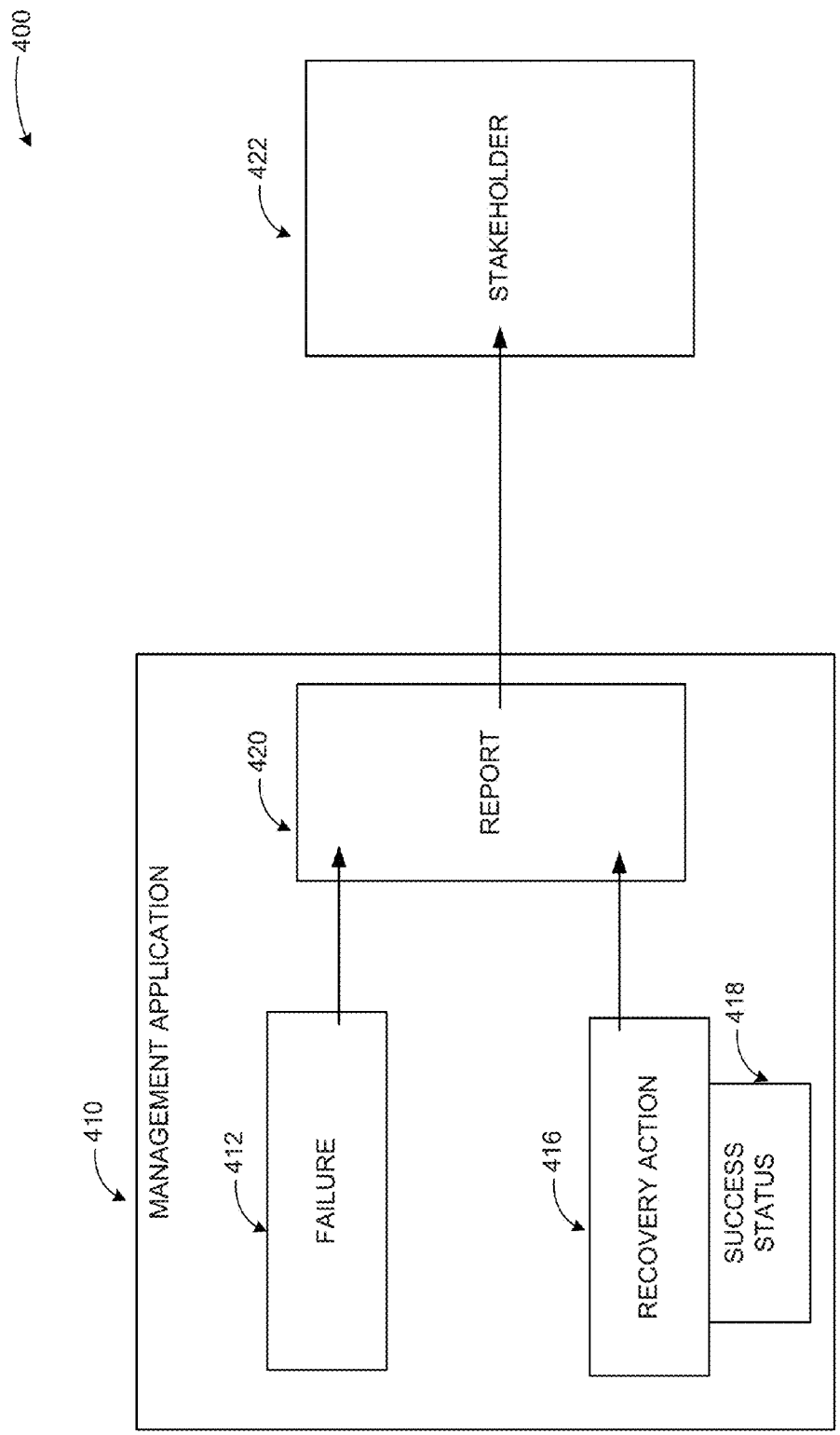
FIG. 4 illustrates reporting features of a scheme to recover a cloud based service based on a customer experience, according to embodiments.

FIG. 4 illustrates reporting features of a scheme to recover a cloud based service based on a customer experience, according to embodiments.

In a diagram 400, a management application 410 may generate a report 420 based on a simulation of a customer experience at a cloud based service to determine one or more failures at the cloud based service. The report 420 may include information associated with a failure 412, a recovery action 416, or a success status 418. The report 420 may be formatted to match a reporting format as requested by a stakeholder 422.

The stakeholder 422 may include a customer associated with the customer experience. The stakeholder 422 may also include an administrator of the cloud based system. The report 420 may be transmitted based on a schedule. Alternatively, the report 420 may be transmitted dynamically based on a conclusion of a simulation of the user experience and resolution of the failure 412.

Technical effect of recovering usability of a cloud based service from a system failure may include enhancements in restoration of a cloud based service when failure conditions with one or more subsystems of the service are detected.

The example scenarios and schemas in FIGS. 2 and 4 are shown with specific components, data types, and configurations. Embodiments are not limited to systems according to these example configurations. Recovering usability of a cloud based service from a system failure may be implemented in configurations employing fewer or additional components in applications and user interfaces. Furthermore, the example schema and components shown in FIGS. 2 and 4 and their subcomponents may be implemented in a similar manner with other values using the principles described herein.

Figure 5:
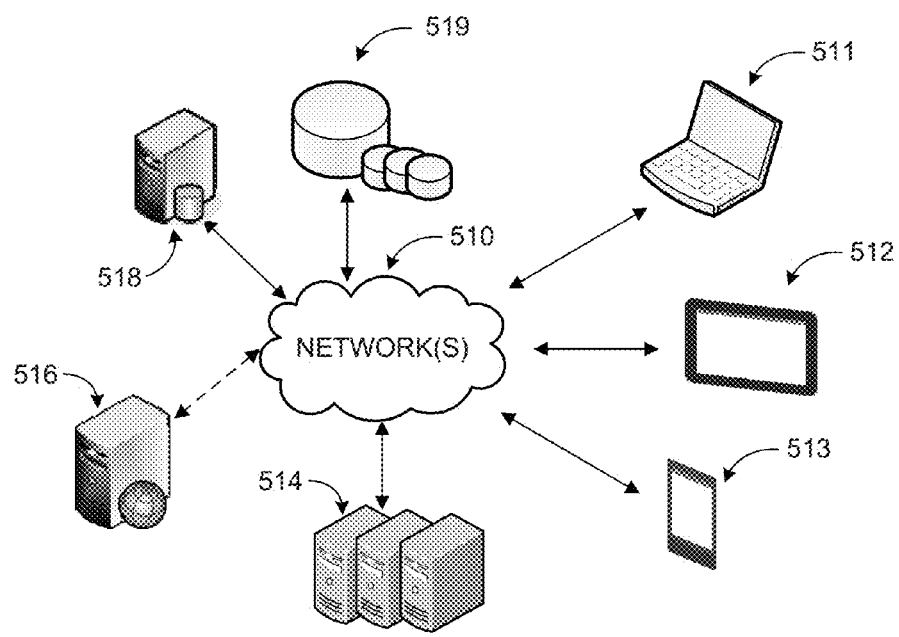
FIG. 5 is a simplified networked environment, where a system according to embodiments may be implemented.

FIG. 5 is an example networked environment, where embodiments may be implemented. A management application configured to provide a customer based recovery of a cloud based service may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. A management application may simulate a customer experience to determine one or more failures at a cloud based service. The failure may be mapped to a recovery action which may be executed and monitored to determine a success status of the recovery action. The management application may store data associated with the failure and the recovery action in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to recover usability of a cloud based service from a system failure. Furthermore, the networked environments discussed in FIG. 5 are for illustration purposes only. Embodiments are not limited to the example applications, modules, or processes.

Figure 6:
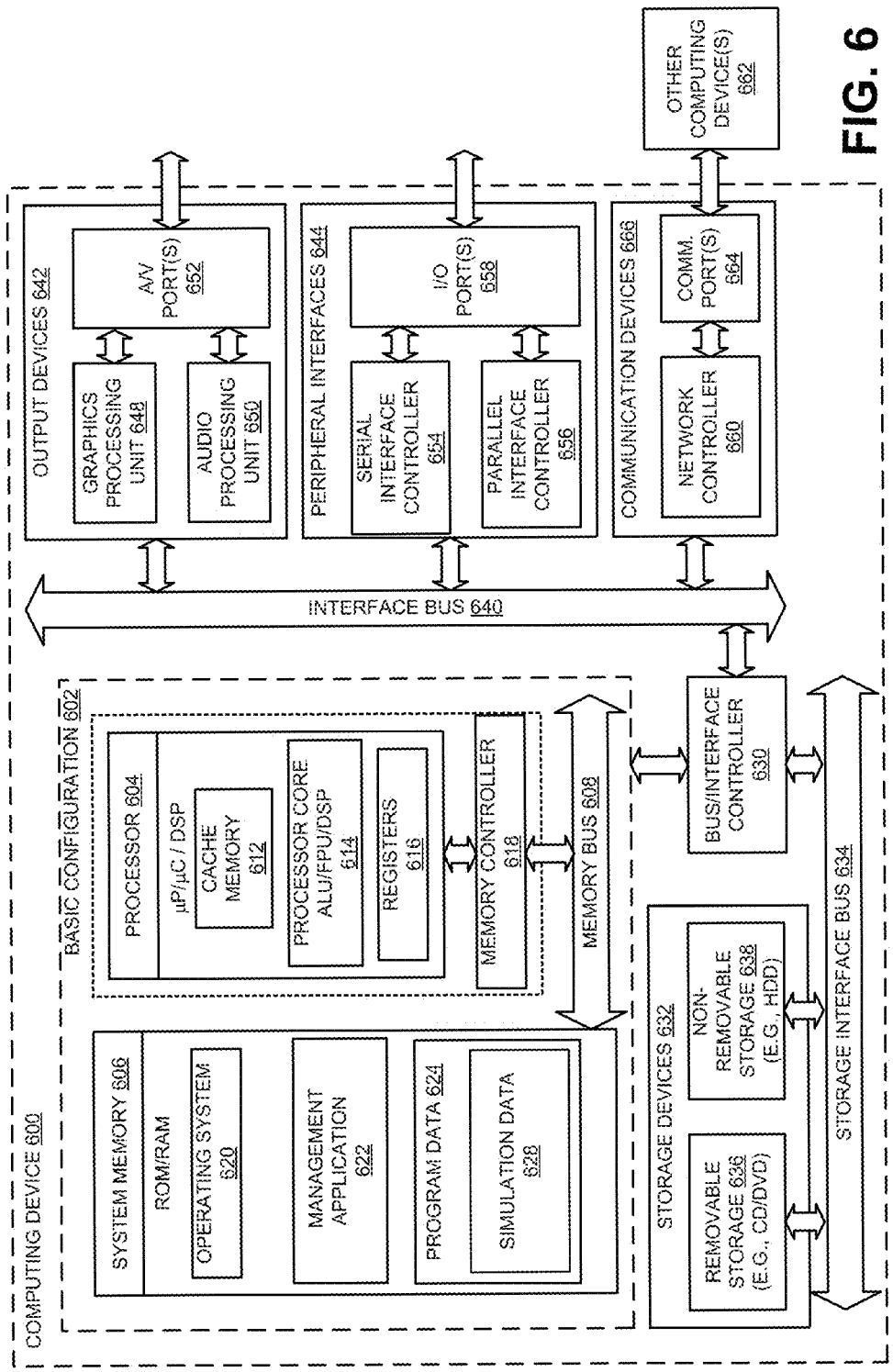
FIG. 6 illustrates a general purpose computing device, which may be configured to recover usability of a cloud based service from a system failure.

FIG. 6 illustrates a general purpose computing device, which may be configured to recover usability of a cloud based service from a system failure, arranged in accordance with at least some embodiments described herein.

For example, the computing device 600 may be used to recover usability of a cloud based service from a system failure. In an example of a basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including, but not limited to, a microprocessor (µP), a microcontroller (µC), a digital signal processor (DSP), or any combination thereof. The processor 604 may include one more levels of caching, such as a level cache memory 612, a processor core 614, and registers 616. The processor core 614 may include an arithmetic logic unit (ALU), a floating point unit (FPU), a digital signal processing core (DSP Core), or any combination thereof. A memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a management application 622, and a program data 624. The management application 622 may simulate a customer experience to determine one or more failures at a cloud based service. The management application 622 may map the failure to a recovery action and execute the recovery action to restore a subsystem associated with the failure. The program data 624 may include, among other data, a simulation data 628, or the like, as described herein. The simulation data 628 may include information associated with the failure and the recovery action.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636, and the non-removable storage devices 638 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 may include a graphics processing unit 648 and an audio processing unit 650, which may be configured to communicate to various external devices, such as a display or speakers via one or more A/V ports 652. One or more example peripheral interfaces 644 may include a serial interface controller 654 or a parallel interface controller 656, which may be configured to communicate with external devices, such as input devices (for example, keyboard, mouse, pen, voice input device, touch input device, etc.) or other peripheral devices (for example, printer, scanner, etc.) via one or more I/O ports 658. An example communication device 666 may include a network controller 660, which may be arranged to facilitate communications with one or more other computing devices 662 over a network communication link via one or more communication ports 664. The one or more other computing devices 662 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include recovery of usability of a cloud based service from a system failure. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 7:
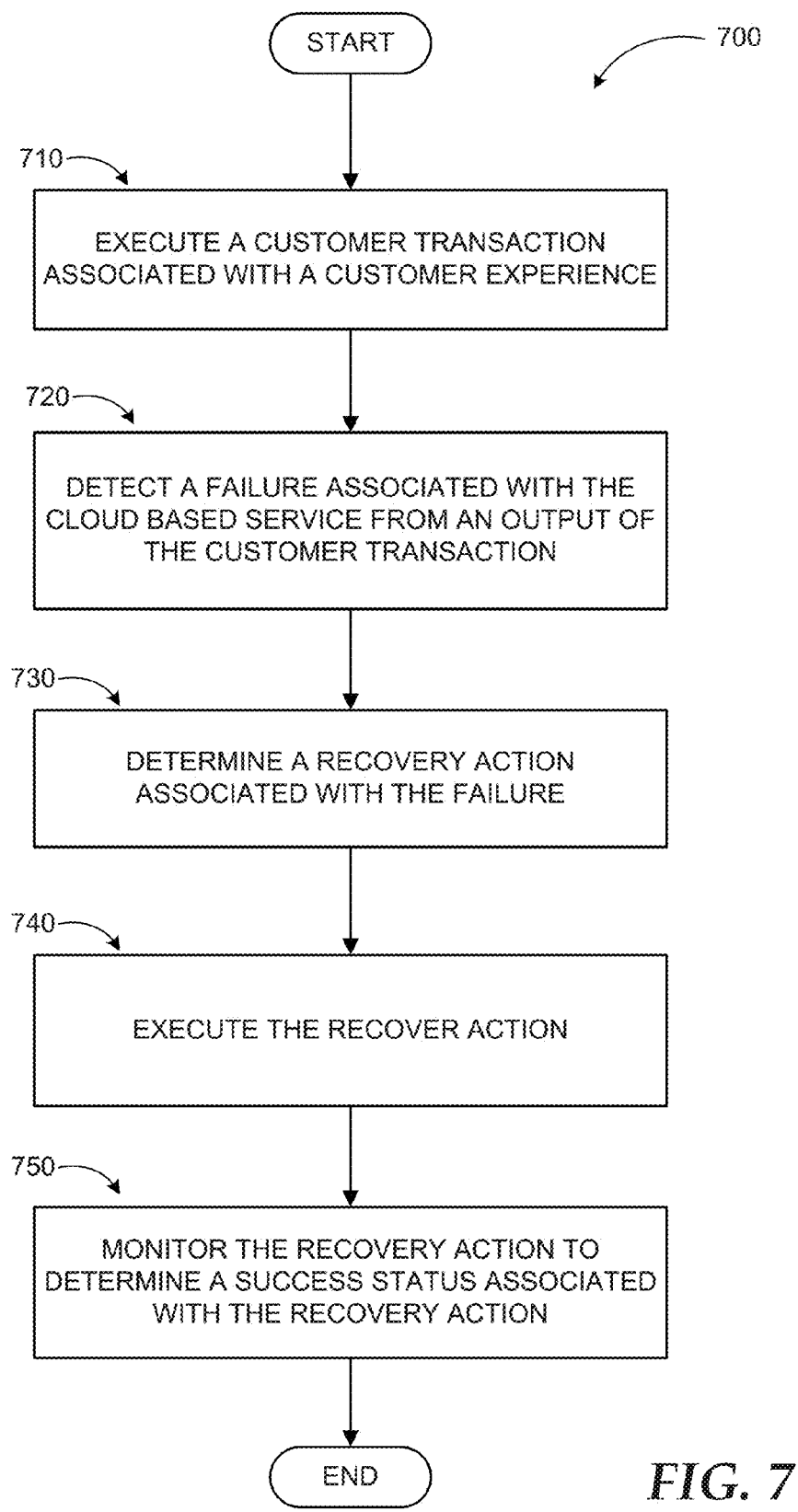
FIG. 7 illustrates a logic flow diagram for a process to recover usability of a cloud based service from a system failure, according to embodiments.

FIG. 7 illustrates a logic flow diagram for a process to recover usability of a cloud based service from a system failure, according to embodiments. Process 700 may be implemented on a management application of the cloud based service.

Process 700 begins with operation 710, where a customer transaction associated with a customer experience may be simulated. The customer transaction may include one or more commands to simulate the customer experience at the cloud based service. At operation 720, a failure associated with the cloud based service may be detected from an output of the customer transaction. A recovery action associated with the failure may be determined at operation 730. The failure may be mapped to the recovery action based on a match at a list of recovery actions. Next, the recovery action may be executed at operation 740. At operation 750, the recovery action may be monitored to determine a success status associated with the recovery action.

The operations included in process 700 are for illustration purposes. A management application according to embodiments may be implemented by similar processes with fewer or additional steps, as well as in different order of operations using the principles described herein.

According to some examples, a method that is executed on a computing device to recover usability of a cloud based service from a failure may be described. The method may include simulating a customer transaction associated with the customer experience, detecting a failure associated with the cloud based service from an output of the customer transaction, determining a recovery action associated with the failure, executing the recovery action, and monitoring the recovery action to determine a success status associated with the recovery action.

According to other examples, the customer experience may be selected from a set of customer experiences associated with a health monitoring of the cloud based service, where the customer experience is selected based on a criteria that includes at least one from a set of: a frequency of use, a historical use distribution, and a recentness of use. A selection of the customer experience from a set of customer experiences associated with a health monitoring of the cloud based service may be received, where the selection may be made by a stakeholder including one from a set of a customer associated with the customer experience and an administrator of the cloud based service. The customer experience may be determined to store the customer transaction along with one or more other customer transactions. The one or more other customer transactions may be simulated to detect the failure or one or more other failures associated with the cloud based service.

According to further examples, the method may further include mapping the failure to a subsystem associated with the cloud based service and executing the recovery action on the subsystem to restore the subsystem to a healthy status. The method may further include mapping the failure to a failed subsystem associated with the cloud based service and executing the recovery action to reroute one or more processes associated with the failed subsystem to a healthy subsystem that provides failover functionality. One or more metrics associated with the customer experience may be tracked while monitoring the recovery action to determine that the one or more metrics are above one or more thresholds associated with the success status. The failure may be matched to the recovery action from a list of recovery actions.

According to other examples, the method may further include in response to a determination that the success status is negative, determining another recovery action that is associated with the failure and executing the other recovery action. The other recovery action may be monitored to determine the success status associated with the other recovery action. The failure may be generated from the output by analyzing the output to differentiate one or more failed subsystems associated with the cloud based service.

According to some examples, a computing device to recover usability of a cloud based service from a failure may be described. The computing device may include a memory, a processor coupled to the memory. The processor may be configured to execute a management application in conjunction with instructions stored in the memory. The management application may be configured to simulate a customer transaction associated with the customer experience, where the customer experience stores the customer transaction, detect a failure associated with the cloud based service from an output of the customer transaction, determine a recovery action associated with the failure, execute the recovery action, and monitor the recovery action to determine a success status associated with the recovery action.

According to other examples, the management application is further configured to generate a report that includes information associated with the failure and transmit the report to a stakeholder associated with the cloud based system, where the stakeholder includes a customer associated with the customer experience and an administrator of the cloud based system. The management application is further configured to generate a report that includes information associated with the recovery action and the success status and transmit the report to a stakeholder associated with the cloud based system, where the stakeholder includes a customer associated with the customer experience and an administrator of the cloud based system.

According to some examples, the management application is further configured to analyze the output to determine one or more criteria that includes at least one from a set of: one or more subsystems associated with the cloud based service that are failing, a number of the one or more subsystems that are failing, and a pattern associated with the one or more subsystems that are failing. The one or more criteria may be included in the failure and the failure may be mapped to the recovery action based on the criteria. An availability number may be generated from metrics associated with one or more subsystems of the cloud based service within the output. The failure may be determined in response to a determination that the availability number is less than a threshold, where the threshold is configurable by an administrator of the cloud based service.

According to some examples, a computer-readable memory device with instructions stored thereon to recover usability of a cloud based service from a failure may be described. The instructions may include actions that are similar to the method described above.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to recover usability of a cloud based service from a failure, the method comprising:
   simulating a customer transaction associated with a customer experience;
   detecting the failure associated with the cloud based service from an output of the customer transaction;
   determining a recovery action associated with the failure;
   executing the recovery action;
   monitoring the recovery action to determine a success status associated with the recovery action; and
   selecting the customer experience from a set of customer experiences associated with a health monitoring of the cloud based service, wherein the customer experience is selected based on a criteria that includes at least one from a set of: a frequency of use, a historical use distribution, and a recentness of use.

2. The method of claim 1, further comprising:
   receiving a selection of the customer experience from a set of customer experiences associated with a health monitoring of the cloud based service, wherein the selection is made by a stakeholder including one from a set of a customer associated with the customer experience and an administrator of the cloud based service.

3. The method of claim 1, further comprising:
   determining the customer experience storing the customer transaction along with one or more other customer transactions; and
   simulating the one or more other customer transactions to detect the failure or one or more other failures associated with the cloud based service.

4. The method of claim 1, further comprising:
   mapping the failure to a subsystem associated with the cloud based service; and
   executing the recovery action on the subsystem to restore the subsystem to a healthy status.

5. The method of claim 1, further comprising:
   mapping the failure to a failed subsystem associated with the cloud based service; and
   executing the recovery action to reroute one or more processes associated with the failed subsystem to a healthy subsystem that provides failover functionality.

6. The method of claim 1, further comprising:
   tracking one or more metrics associated with the customer experience while monitoring the recovery action to determine that the one or more metrics are above one or more thresholds associated with the success status.

7. The method of claim 1, further comprising:
   matching the failure to the recovery action from a list of recovery actions.

8. The method of claim 1, further comprising:
   in response to a determination that the success status is negative, determining another recovery action that is associated with the failure; and
   executing the other recovery action.

9. The method of claim 8, further comprising:
   monitoring the other recovery action to determine the success status associated with the other recovery action.

10. The method of claim 1, further comprising:
    generating the failure from the output by analyzing the output to differentiate one or more failed subsystems associated with the cloud based service.

11. A computing device to recover usability of a cloud based service from a failure, the computing device comprising:
    a memory;
    a processor coupled to the memory, the processor executing a management application in conjunction with instructions stored in the memory, wherein the management application is configured to:
        simulate a customer transaction associated with a customer experience, wherein the customer experience stores the customer transaction;
        detect the failure associated with the cloud based service from an output of the customer transaction;
        determine a recovery action associated with the failure;
        execute the recovery action;
        monitor the recovery action to determine a success status associated with the recovery action; and select the customer experience from a set of customer experiences associated with a health monitoring of the cloud based service, wherein the customer experience is selected based on a criteria that includes at least one from a set of; a frequency of use, a historical use distribution, and a recentness of use.

12. The computing device of claim 11, wherein the management application is further configured to:
   generate a report that includes information associated with the failure; and
   transmit the report to a stakeholder associated with the cloud based system, wherein the stakeholder includes a customer associated with the customer experience and an administrator of the cloud based system.

13. The computing device of claim 11, wherein the management application is further configured to:
   generate a report that includes information associated with the recovery action and the success status; and
   transmit the report to a stakeholder associated with the cloud based system, wherein the stakeholder includes a customer associated with the customer experience and an administrator of the cloud based system.

14. The computing device of claim 11, wherein the management application is further configured to:
   analyze the output to determine one or more criteria that includes at least one from a set of: identification information of one or more subsystems associated with the cloud based service that are failing, a number of the one or more subsystems that are failing, and a pattern associated with the one or more subsystems that are failing.

15. The computing device of claim 14, wherein the management application is further configured to:
   include the one or more criteria in the failure; and
   map the failure to the recovery action based on the criteria.

16. The computing device of claim 11, wherein the management application is further configured to:
   generate an availability number from metrics associated with one or more subsystems of the cloud based service within the output;
   determine the failure in response to a determination that the availability number is less than a threshold, wherein the threshold is configurable by an administrator of the cloud based service.

17. A computer-readable memory device with instructions stored thereon to recover usability of a cloud based service from a failure, the instructions comprising:
   simulating a customer transaction associated with a customer experience, wherein the customer experience stores the customer transaction;
   detecting the failure associated with the cloud based service from an output of the customer transaction;
   determining a recovery action associated with the failure;
   executing the recovery action;
   monitoring the recovery action to determine a success status associated with the recovery action;
   generating a report that includes information associated with the failure, the recovery action, and the success status;
   transmitting the report to a stakeholder associated with the cloud based system, wherein the stakeholder includes a customer associated with the customer experience and an administrator of the cloud based system; and
   tracking one or more metrics associated with the customer experience while monitoring the recovery action to determine that the one or more metrics are above one or more thresholds associated with the success status.

18. The computer-readable memory device of claim 17, wherein the instructions further comprise:
   in response to a determination that the success status is negative, determining another recovery action that is associated with the failure;
   executing the other recovery action; and
   monitoring the other recovery action to determine the success status associated with the other recovery action.

19. The computer-readable memory device of claim 17, wherein the instructions further comprise:
   analyzing the output to determine one or more criteria that includes at least one from a set of: identification information of one or more subsystems associated with the cloud based service that are failing, a number of the one or more subsystems that are failing, and a pattern associated with the one or more subsystems that are failing;
   including the one or more criteria in the failure; and
   mapping the failure to the recovery action based on the criteria.

* * * * *